United States Patent [19]
Boaz

[11] Patent Number: 5,091,003
[45] Date of Patent: Feb. 25, 1992

[54] INK COMPOSITIONS AND METHOD FOR PLACING INDICIA ON GLASS

[75] Inventor: Premakaran T. Boaz, Livonia, Mich.

[73] Assignee: Ford Motor Company, Dearborn, Mich.

[21] Appl. No.: 538,456

[22] Filed: Jun. 15, 1990

[51] Int. Cl.⁵ .................. C09D 11/00; B05D 3/00; C03C 21/00
[52] U.S. Cl. ................... 106/20; 427/226; 65/30.13
[58] Field of Search ............ 106/19, 20; 427/226; 65/30.13

[56] References Cited

U.S. PATENT DOCUMENTS

| | | | |
|---|---|---|---|
| 3,967,040 | 6/1976 | Plumat et al. | 65/30.13 |
| 4,147,823 | 4/1979 | Lavallee | 106/20 |
| 4,397,667 | 8/1983 | Morimoto et al. | 65/30.13 |
| 4,896,074 | 1/1990 | Williams et al. | 106/19 |

Primary Examiner—Mark L. Bell
Assistant Examiner—Helene Klemanski
Attorney, Agent, or Firm—Charles H. Ellerbrock; Roger L. May

[57] ABSTRACT

Indicia is permanently affixed to a glass article utilizing a low viscosity silver nitrate-containing thermal diffusion ink composition which is applied in a predetermined pattern to the surface of the glass article by a non-contact ink jet printer. Subsequently, the glass article having the ink thereon is heated to a temperature and for a time, sufficient to cause silver ions from the ink to diffuse into the glass article to color the glass and form indicia substantially conforming to the originally applied predetermined pattern.

16 Claims, No Drawings

INK COMPOSITIONS AND METHOD FOR PLACING INDICIA ON GLASS

FIELD OF THE INVENTION

The present invention relates generally to ink compositions and a method employing the ink compositions for placing indicia on glass. More particularly, the invention is directed to silver nitrate-containing ink compositions having a low viscosity thereby facilitating their application to the surface of a glass article by a non-contact ink jet printing process, and a method for permanently affixing indicia to glass utilizing the low viscosity silver nitrate-containing ink compositions wherein silver ions from the ink diffuse into the surface-region of the glass upon heating of the glass article.

BACKGROUND OF THE INVENTION

Methods and ink compositions for placing indicia on glass are well known in the art. Typically, ink in the form of a paint or paste is applied to the surface of a glass article in a predetermined pattern, then dried to form indicia on the surface of the glass. Surface applied paints, however, are susceptible to damage due to abrasion, chemical attack, thermal cycling of the glass article, etc.

Indicia may permanently be affixed to glass utilizing thermal diffusion dyes containing metallic compounds such as, for example, silver, gold, or copper salts. Generally such thermal diffusion dyes are in the form of a viscose paint, or paste containing a metallic salt, which is applied to the surface of a glass article in a predetermined pattern. After the paint has dried, the glass article, including the thermal diffusion paint thereon, is heated to a temperature and for a time, sufficient to cause the metallic ions contained in the paint to diffuse into the glass article where the metal ions impart color to the glass. For example, copper diffusion dyes produce a red coloration in glass. Thus, the glass receives permanent indicia having a pattern substantially identical to the predetermined pattern of the originally applied thermal diffusion dye. Such indicia have superior chemical resistance and thermal stability, and are not susceptible to damage by abrasion.

The thermal diffusion dyes known in the prior art are generally applied as relatively thick, viscose layers on the surface of a glass article by brushing, spreading, or screen printing. These dye compositions must be highly viscose in order to retain their initially applied configuration through the drying and heating steps. Such highly viscose dyes would not be suitable for use in certain application devices such as, for example, a non-contact ink jet printer. However, the use of such a printer for applying a thermal diffusion ink to glass would be highly desirable due to its ease of operation, precise pattern repeatability, and flexibility, allowing instant modification of the printed pattern. For example, a non-contact ink jet printer could easily be adapted to apply consecutive numbers to the surfaces of consecutively produced glass articles, whereas a similar method for applying consecutive numbers in the form of surface applied indicia may only be accomplished by changing masks when using a screen printing operation.

Kume U.S. Pat. No. 4,056,643 discloses a method and dye composition for staining the entire surface of a glass article, to produce a granite-like mosaic decorative design having areas which appear irregular in size and shape of coloration, and which vary in shading and variety of colors. A staining composition, comprising at least one of a silver compound such as, for example, silver nitrate, and a copper compound, together with a vanadium compound capable of forming vanadium pentoxide by its subsequent heat treatment, is applied to the entire surface of a glass article. Thereafter, the glass article is heated to a temperature and for a period of time sufficient to obtain the desired degree of granite-like coloration and visual texture. It is theorized that the vanadium compound is converted to vanadium pentoxide which forms a melt together with the silver or copper compound on the surface of the glass. The melt forms an assemblage of droplets having irregular sizes and concentrations of the silver or copper compound. This non-uniform distribution results in the variation of coloration and shading in the ultimately produced stained glass article. Such a process would not be useful, however, for affixing precisely reproducible indicia to portions of the surface of a glass article.

Kiefer U.S. Pat. No. 3,907,586 discloses glass articles which are colored brown to reddish-brown over their entire surfaces. Borosilicate glass, free from arsenic and antimony, is melted along with 0.005 to 0.5 weight percent tin, to form glass articles which thereafter may be stained by the application and heat treatment of a silver diffusion dye. The tin introduced into the melt is necessary to reduce the silver ions which subsequently diffuse into the glass. The patent also discloses that it is known to add silver to a soda-lime-silica glass melt, to produce glass having a yellow color. The patent, however, neither teaches nor suggests a method for permanently affixing indicia to a portion of the surface of a glass article.

Ball U.S. Pat. No. 4,835,208 discloses the use of a non-contact ink jet printer for placing surface indicia on glass, and hot melt ink compositions for use therein. The disclosed ink compositions are said to solidify rapidly on the cooler surface of the glass substrate, to give a sharp image which is resistant to smudging. The patent does not, however, suggest the use of thermal diffusion inks containing silver nitrate, and teaches away from the step of heating the glass article after the hot melt ink indicia has been applied which would cause the hot melt ink to remelt and run.

It must be noted that the prior art referred to hereinabove has been collected and examined only in light of the present invention as a guide. It is not to be inferred that such diverse art would otherwise be assembled absent the motivation provided by the present invention. The prior art teaches that ink compositions for placing indicia on glass surfaces must be highly viscose in order to retain their as-applied configuration or pattern during subsequent fixing treatments which generally require heating of the glass article. Such a heating step would otherwise cause a predetermined pattern formed from a low viscosity material to run or smear. Thus, the prior art suggests that very low viscosity inks are not to be used for placing indicia on glass. Furthermore, the highly viscose inks taught in the prior art cannot be used in conjunction with a non-contact ink jet printer, due to the inherent limitations on viscosity which must be observed to insure the stable formation of ink droplets and to prevent plugging of the small diameter printer nozzles. Finally, although the prior art teaches that indicia may be placed on glass either by screen printing a highly viscose paint or by ink jet printing a lower viscosity hot melt ink onto the surface of the glass, such indicia could permanently be affixed to the glass, if either composition contained a thermal diffusion dye, only by heating the glass to a very high temperature. Such a heating step might successfully be performed on a glass article having screen printed indicia thereon. However, the prior art suggests that such a heating step would destroy lower viscosity hot melt ink indicia applied by an ink jet printer. Since hot melt indicia are rapidly solidified or frozen onto the cooler surface of the glass article, any subsequent heating step would cause the applied indicia to run. Thus, the prior art suggests that an ink jet printer may not be used to permanently affix indicia to glass where the process for doing so includes the step of heating the glass article.

It would be desirable to prepare a thermal diffusion ink composition which is useful for permanently affixing indicia to glass, having a low viscosity for use in a non-contact ink jet printer. The thermal diffusion dyes presently known in the art as useful for placing indicia on glass are highly viscose materials which are generally applied to the surface of a glass article by a screen printing process, and therefore would not be operable in an ink jet printer. Moreover, it would be desirable to permanently affix indicia to glass, utilizing a non-contact ink jet printer and silver nitrate-containing thermal diffusion ink which is thereafter heat treated without destroying the predetermined pattern to cause silver ions to diffuse into the surface region of the glass article. The prior art suggests the use of conventional hot melt ink compositions in conjunction with an ink jet printer, to place indicia, which would be susceptible to abrasion and corrosive attack, on the surface of glass. The prior art does not suggest, however, the use of a silver-containing thermal diffusion ink in such a device, which is applied to a glass surface and thereafter heat treated to penetrate and permanently affix indicia to a glass article.

SUMMARY OF THE INVENTION

Accordant with the present invention, an ink composition for permanently affixing indicia to glass has surprisingly been discovered, comprising:
A. from about 0.01% to about 2.5% by weight silver nitrate; and
B. a vehicle,
the ink having a viscosity less than about 4 centipoise at a temperature at which the ink is applied to the glass.

Moreover, it has surprisingly been discovered that indicia may permanently be affixed to glass by a process, comprising the steps of:
A. providing a glass article, including a surface;
B. applying to the surface in a predetermined pattern by non-contact ink jet printing an ink composition, comprising:
  i. from about 0.01% to about 2.5% by weight silver nitrate; and
  ii. a vehicle,
the ink having a viscosity less than about 4 centipoise at a first temperature at which the ink is applied to the glass; and
C. heating the glass article having the ink thereon to a second temperature and for a time, sufficient to cause silver ions from the ink to diffuse into the glass article, whereby indicia substantially conforming to the predetermined pattern is permanently affixed to the glass article.

The ink compositions and process for permanently affixing indicia to glass of the present invention are particularly useful for placing permanent identification marks, trademarks, production dates, lot numbers, sequential numerical codes, and the like, onto glass articles such as, for example, automotive and architectural glazings.

DETAILED DESCRIPTION OF THE PREFERRED EMBODIMENT

The ink compositions of the present invention comprise from about 0.01% to about 2.5% by weight silver nitrate, and a vehicle; with the proviso that the viscosity of the ink composition must be less than about 4 centipoise at its temperature of application to the glass surface. The upper concentration limitation is necessary to prevent precipitation of silver or silver nitrate crystals onto the internal surfaces of the nozzles and associated components of a non-contact ink jet printer, when the inventive ink composition is employed in such a device.

Suitable vehicles for use in the ink compositions of the present invention include, but are not limited to, diethylene glycol butyl ether, diethylene glycol dibutyl ether, dipropylene glycol, diethylene glycol, glycerol, and the like, as well as aqueous and non-aqueous mixtures thereof. A preferred vehicle is an aqueous solution of diethylene glycol butyl ether. The vehicle must, of course, be capable of completely solubilizing the silver nitrate. The resultant silver nitrate-containing ink must have a viscosity less than about 4 centipoise at the temperature at which the ink is applied to the surface of the glass. Ink compositions having greater viscosities, such as those disclosed in the prior art, would adversely affect the operation of a non-contact ink jet printer, by clogging the ink flow channels and blinding the printer nozzles.

A non-contact ink jet printer contemplated as useful for practicing the present invention typically comprises a conduit for transporting ink under pressure from a reservoir to a series of nozzles via valve means which control the flow of the ink through each nozzle. The valve means is generally an electro-mangetically actuated valve. The ink is discharged through the nozzles as discrete droplets in the desired sequence to form the desired predetermined pattern on the glass article. Usually, the nozzles are arranged in one or more series traversly to the direction of movement of the glass article. Typically, such printers have fast-acting valves with an operating cycle time from 1 to 5 milliseconds, feeding nozzles having orifice bore diameters from 0.01 to 0.45 millimeters. Alternatively, a preferred non-contact ink jet printer operates by the principle of electrostatic deflection, whereby a continuous flow of the individual, electrostatically charged ink droplets is discharged from a single nozzle and directed between electro-magnetic deflector plates to be precisely placed in a predetermined pattern on the surface of the glass article. While not in the printing mode, the continuous flow of undeflected ink droplets is directed into a return conduit which communicates with the ink supply reservoir. A non-contact electrostatic ink jet printer suitable for use according to the present invention is the PRINTOS 3800 ®, manufactured by Willett of Fort Worth, Tex. Clearly, the thermal diffusion dye compositions generally known in the art as useful for coating glass in a predetermined pattern, e.g., by silk screen printing, are much too viscose for use in non-contact ink jet printing devices.

The glass articles useful for practicing the present invention are prepared from those glasses commonly known to be colorable by thermal diffusion inks. A preferred glass is generally known in the art as soda-lime-silica glass. Typical glass articles contemplated for receiving indicia according to the present invention include automotive and architectural glazings, generally produced by the well known float glass process, as well as laminated structures made therefrom. However, indicia may permanently be affixed to any glass article by the process of the present invention.

In operation, an ink composition of the present invention is applied at a temperature from about 70° F. to about 200° F. as a thin layer to the surface of a glass article in a predetermined pattern, utilizing a non-contact ink jet printer. Thereafter, the glass article, having the ink thereon, is heated to a temperature and for a time, sufficient to cause silver ions from the ink composition to diffuse through the surface of the glass into the surface-region of the glass article. By "surface-region of the glass," as the term is used herein, is meant the volumetric portion of the glass immediately below the surface upon which the ink has been applied by the non-contact ink jet printer.

While not wishing to be bound by any particular theory concerning the silver ion diffusion process according to the present invention, it appears that the diffusing silver ions replace the monovalent alkali metal ions by an ion exchange process. The diffusion of silver ions into the glass article is rapid, apparently because the silver ion is not very much larger than the sodium ion which it replaces, thereby causing minimal strain in the glass matrix.

After the ink has been applied to the surface of the glass article in the desired predetermined pattern, the glass article is heated to a temperature which is less than its softening point; typically about 1,150° F. for a soda-lime-silica glass. Preferably, a soda-lime-silica glass article is heated to a temperature in the range from about 900° F. to about 1,200° F. The silver ions diffuse from the ink into the surface-region of the glass, generally within about 5 minutes. Preferably, the glass article is maintained at the elevated temperature for a time period from about 30 seconds to about 3 minutes. Higher temperatures and longer time periods will, of course, result in darker staining of the glass by the silver ions. In this way, the coloration of the resulting indicia can be made to vary from a light yellow to a dark reddish-brown. In addition to the ion exchange, a reduction of the silver ions to metallic silver particles within the glass matrix may also take place during the heating cycle. The color depth or chroma also depends on the quantity and types of reducing agents which are present in the glass. Known reducing agents for the silver ions are arsenic, antimony, and iron, of which the latter is present in many soda-lime-silica glasses as a solar control agent.

Thus, indicia substantially conforming to the predetermined pattern of the ink composition as originally applied to the surface of the glass is permanently affixed to the glass article. Such indicia may include identification marks, trademarks, production dates, lot numbers, sequential numbering codes, and the like.

The process for permanently affixing indicia to glass according to the present invention is particularly useful for marking glass articles with production information, e.g., dates and times of manufacture, glass batch lot numbers, glass batch ingredient codes, usage or performance designation codes, etc. As an example, the process of the present invention can be used to permanently affix a lot number to a sheet of glass, thereby designating the specific set of process conditions by which the glass sheet was manufactured. If the glass sheet so designated were then utilized in the manufacture of a laminated automobile windshield, which later during use proved to be defective, the permanently affixed lot number would be useful for identifying those manufacturing process conditions which might have contributed to the windshield's defective condition, and allow the recall of all other windshields carrying that particular lot number for inspection or testing. Similarly, each glazing produced could be individually denominated, e.g., by consecutive serial numbers, for later identification in the field.

The invention is more easily comprehended by reference to specific embodiments which are representative of the invention. It must be understood, however, that the specific embodiments are provided only for the purposes of illustration and understanding, and that the invention may be practiced otherwise than as specifically illustrated and described without departing from its spirit and scope. For example, even lower viscosity inks could be used, which would allow for more stable operation of the ink jet printer, and consequently better resolution of the predetermined pattern on the glass surface. Also, lower concentrations of silver nitrate in the ink compositions would produce lighter indicia, finally resulting in very light yellow indicia at the lowest concentrations.

EXAMPLES 1-4

Silver nitrate is dissolved in deionized water and diethylene glycol butyl ether, to prepare the thermal diffusion inks set forth in Table 1. A PRINTOS 3800® non-contact electrostatic ink jet printer is used to individually apply the inks in a predetermined pattern onto the surfaces of soda-lime-silica glass sheets. The glass sheets are thereafter heated to a temperature of about 1,100° F. for about 1 minute. When the glass sheets are cooled to room temperature, it is observed that permanent indicia have been affixed to the glass sheets in substantially the same predetermined pattern as that of the inks initially applied to the glass sheets. The indicia generally comprise coloration of the glass sheets at the surface regions of the glass sheets below the initially applied pattern.

TABLE 1

| INK COMPOSITIONS AND PRINTING RESULTS | | | |
|---|---|---|---|
| Sample | Wt % AgNO$_3$ | Wt % H$_2$O | Viscosity cps | Indicia |
| Example 1 | 0.25 | 67.4 | 3.5 | yellowish-brown |
| Example 2 | 0.61 | 67.0 | 3.5 | light brown |
| Example 3 | 1.23 | 66.4 | 3.5 | dark maroon |
| Example 4 | 2.45 | 65.3 | 3.3 | dark maroon |
| Comparison 1 | 2.93 | 77.8 | 6 | * |
| Comparison 2 | 3.44 | 91.4 | 8 | * |
| Comparison 3 | 4.29 | 63.8 | 3.5 | ** |

*Operation of ink jet printer unstable; excessive ink viscosity causes non-uniform droplets.
**Operation of ink jet printer unstable; AgNO$_3$ crystals precipitate and clog printer nozzle.

What is claimed is:

1. An ink composition for permanently affixing indicia to glass, comprising:
   A. from about 0.01% to about 2.5% by weight silver nitrate; and
   B. a vehicle capable of completely solubilizing silver nitrate selected from the group consisting of glycols, glycol ethers, diethylene glycol dibutyl ether, glycerol, and aqueous and non-aqueous mixtures thereof;

the ink having a viscosity less than about 4 centipoise at a temperature at which the ink is applied to the glass.

2. The ink composition according to claim 1, wherein the vehicle comprises an aqueous solution of diethylene glycol butyl ether.

3. An electrostatic ink jet printing compatible thermal diffusion ink composition for permanently affixing indicia to a glass sheet, comprising:
   A. from about 0.01% to about 2.5% by weight silver nitrate; and
   B. a vehicle capable of completely solubilizing silver nitrate selected from the group consisting of glycols, glycol ethers, diethylene glycol dibutyl ether, glycerol, and aqueous and non-aqueous mixtures thereof;
   the ink having a viscosity less than about 4 centipoise at a temperature from about 70° F. to about 200° F.

4. A process for permanently affixing indicia to glass, comprising the steps of:
   A. providing a glass article, including a surface;
   B. applying to the surface in a pattern by non-contact ink jet printing an ink composition comprising:
      i. from about 0.01 to about 2.5% by weight silver nitrate; and
      ii. a vehicle capable of completely solubilizing silver nitrate selected from the group consisting of glycols, glycol ethers, diethylene glycol dibutyl ether, glycerol, and aqueous and non-aqueous mixtures thereof,
   the ink having a viscosity less than about 4 centipoise at a temperature from about 70° F. to about 200° F.; and
   C. heating the glass article having the ink thereon to a temperature and for a time, sufficient to cause silver ions from the ink to diffuse into the glass article,
   whereby indicia substantially conforming to the pattern is permanently affixed to the glass article.

5. The process for permanently affixing indicia to glass according to claim 4, wherein the vehicle comprises an aqueous solution of diethylene glycol butyl ether.

6. The process for permanently affixing indicia to glass according to claim 4, wherein the ink jet printer comprises a non-contact electrostatic ink jet printer.

7. The process for permanently affixing indicia to glass according to claim 4, wherein the second temperature is from about 900° F. to about 1,200° F.

8. The process for permanently affixing indicia to glass according to claim 4, wherein the time is from about 30 seconds to about 3 minutes.

9. A process for permanently affixing indicia to a glass sheet, comprising steps of:
   A. providing a glass sheet, including a surface;
   B. applying to the surface in a pattern by contacting therewith droplets generated by a non-contact ink jet printer an ink composition, comprising:
      i. from about 0.01% to about 2.5% by weight silver nitrate; and
      ii. ii. a vehicle capable of completely solubilizing silver nitrate selected from the group consisting of glycols, glycol ethers, diethylene glycol dibutyl ether, glycerol, and aqueous and non-aqueous mixtures thereof, said vehicle being effective to insure stable generation of droplets from the ink jet printer, the ink having a viscosity less than about 4 centipoise at a temperature from about 70° F. to about 200° F.; and
   C. heating the glass article having the ink thereon to a temperature and for a time, sufficient to cause silver ions from the ink to diffuse into the glass article,
   whereby indicia substantially conforming to the pattern is permanently affixed to the glass sheet.

10. A process for permanently affixing indicia to soda-lime-silica glass glazings for automotion or architectural use, comprising the steps of:
   A. providing a glazing, including a surface;
   B. applying to the surface in a pattern by non-contact electrostatic ink jet printing an ink composition, comprising:
      i. from about 0.01% to about 2.5% by weight silver nitrate; and
      ii. an aqueous solution of diethylene glycol butyl ether,
   the ink having a viscosity less than about 4 centipoise at a temperature from about 70° F. to about 200° F.; and
   C. heating the glazing having the ink thereon to a temperature from about 900° F. to about 1,200° F and for a time from about 30 seconds to about 3 minutes, sufficient to cause silver ions from the ink to diffuse into the glazing,
   whereby indicia substantially conforming to the pattern is permanently affixed to the glazing.

11. In a glazing for automotive or architectural use having permanent indicia affixed thereto, the improvement wherein the indicia is affixed by the process of claim 4.

12. In a glazing for automotive or architectural use having permanent indicia affixed thereto, the improvement wherein the indicia is affixed by the process of claim 9.

13. In a glazing for automotive or architectural use having permanent indicia affixed thereto, the improvement wherein the indicia is affixed by the process of claim 10.

14. A process for denominating a glazing for subsequent identification, comprising permanently affixing indicia to the glazing by the process of claim 4.

15. A process for denominating a glazing for subsequent identification, comprising permanently affixing indicia to the glazing by the process of claim 9.

16. A process for denominating a glazing for subsequent identification, comprising permanently affixing indicia to the glazing by the process of claim 10.

* * * * *